United States Patent [19]
Olechowski
[11] 3,725,477
[45] Apr. 3, 1973

[54] OXIMINO KETONES AND METHOD FOR MANUFACTURING AMINO ACIDS FROM SAID KETONES

[75] Inventor: Jerome Robert Olechowski, Trenton, N.J.
[73] Assignee: Cities Service Company, New York, N.Y.

[22] Filed: Aug. 27, 1971
[21] Appl. No.: 175,727

[52] U.S. Cl............260/566 A, 260/404, 260/534 R, 260/566 A, 204/158 R
[51] Int. Cl...............................................C07c 119/00
[58] Field of Search..................................260/566 A

[56] References Cited

UNITED STATES PATENTS

| | | | |
|---|---|---|---|
| 3,107,232 | 10/1963 | Matlack | 260/566 A X |
| 3,428,625 | 2/1969 | Strauss | 260/566 A X |
| 3,517,047 | 6/1970 | Dhno et al. | 260/566 A X |
| 3,651,142 | 3/1972 | Freedman | 260/566 A X |

*Primary Examiner*—Leon Zitver
*Assistant Examiner*—Gerald A. Schwartz
*Attorney*—J. Richard Geaman

[57] ABSTRACT

Cycloalkane oximino ketones containing up to about 12 ring carbon atoms are prepared by reacting a cyclic hydrocarbon containing up to about 12 ring carbon atoms with hydroxyl amine and oxygen in the presence of a cuprous salt and ultra-violet radiation. The oximino ketones are oxidized to the hydroxamido alkanoic acid which is reduced catalytically to an amino acid. Cyclododecane is reacted in one embodiment with hydroxyl amine and oxygen in the presence of a cuprous salt and ultra-violet light to obtain 1-oximinocyclododecane-2-one which, in turn is oxidized to 12-hydroxamidododecanoic acid, this acid being reduced to 12-aminododecanoic acid. The amino acid is heated to obtain a polyamide which is used for the manufacture of fibers and molded articles, such as containers and the like.

1 Claim, No Drawings

OXIMINO KETONES AND METHOD FOR MANUFACTURING AMINO ACIDS FROM SAID KETONES

The present invention relates to a novel process for the manufacture of cycloalkane oximino ketones such as 1-oximinocycloalkane-2-ones, novel compositions comprising said oximino ketones and a novel process for the preparation of amino acids employing said oximino ketones as intermediates.

Several methods are known in the art for the manufacture of intermediates for the preparation of polyamide resins, one of which comprises the carbonylation of an unsaturated cyclic hydrocarbon by means of an oxo process to obtain a cyclic aldehyde followed by oxidation of the aldehyde to the corresponding monocarboxylic acid followed by nitrosation to the lactam which, in turn, is converted to a polyamide by heating.

The oxo reaction is run at elevated temperatures and pressures. Special high pressure reaction vessels and handling techniques are required for operating this type of process.

The objects of the present invention are to provide novel compositions. Another object of the invention is to provide novel compositions which are useful in the manufacture of polyamide resins. An additional object of the invention is to provide a novel process for obtaining the aforementioned compositions.

These and other objects are obtained according to the present invention by oxidizing cycloalkanes in the presence of hydroxylamine, a copper salt and light whereby a cycloalkane nitroso ketone is initially formed and photochemically isomerized to a cycloalkane oximino ketone. The cycloalkane oximino ketone is oxidatively cleaved to obtain an omega-hydroxamidoalkanoic acid which is catalytically reduced to the desired amino acid.

In one embodiment of the invention, cyclododecane is oxidized in the presence of hydroxylamine, copper chloride and light to initially form a nitrosocyclododecane-2-one which is isomerized photochemically to form 1-oximinocyclododecane-2-one, oxidized to 12-hydroxamidododecanoic acid which is reduced catalytically to 12-aminododecanoic acid.

The cycloalkane reacted with hydroxylamine and oxygen in the presence of the copper catalyst may be any saturated cyclic hydrocarbon having up to about 12 ring carbon atoms and preferably comprises a saturated cyclic hydrocarbon containing about 12 ring carbon atoms. Saturated cyclic hydrocarbons in this regard also comprise the 6, 8 and 10 ring carbon atom compounds. The most preferred cyclic hydrocarbons in this regard comprise those that are free of any organic or inorganic substituents.

The oxidation of the cyclic hydrocarbons in the presence of hydroxylamine is effected by means of oxygen, oxygen mixed with nitrogen and/or the so-called inert or rare gases, helium, neon, argon, krypton, xenon or radon. Oxygen obtained by the decomposition of oxygen containing compounds known in the art may also be employed in the aforementioned oxidation of the cyclic hydrocarbons in the presence of hydroxylamine.

As can be seen from the foregoing description, the method of the invention comprises three separate steps, the first of which will be characterized as oxidation and photochemical isomerization, the second of which will be described as an oxidative cleaving and the third as a reduction.

The copper salt employed in the oxidation and photochemical isomerization may be any salt of copper, whether an organic salt or inorganic salt, and preferably comprises the salts of bivalent copper. The most preferred copper salts comprise the cupric halides, especially cupric chloride, cupric bromide and cupric iodide.

The oxidation and photochemical isomerization is also conducted in the presence of ultraviolet light. Any source of ultraviolet radiation may be employed, such as sunlight, or a low pressure, high pressure or medium pressure mercury vapor lamp.

The oxidation and photochemical isomerization is conducted for a period of time sufficient to form the novel 1-oximinocycloalkane-2-ones. The temperature and pressure for conducting the reaction are not critical. The reaction is run at atmospheric pressure by which it is intended to include any fluctuations in pressure due to a natural change in ambient conditions, whereas the temperature is generally sufficiently high so as to maintain the reactants at or slightly above the melting point of the cyclic hydrocarbon employed in the oxidation and photochemical isomerization.

Pressures from about 0.5 atmospheres to about 5 atmospheres may be employed and temperatures anywhere from about $-10°$ C. up to about $150°$ C. may be used. The lower temperatures may be employed if a solvent is also used in the oxidation and photochemical isomerization. Solvents that can be used in this regard comprise any solvent that is empirically observed to be inert towards the reactants by which it is intended that any solvent may be employed which dissolve the reactants and which does not enter into and/or does not adversely affect the process.

The initial oxidation and photochemical isomerization step is then followed by a second step comprising oxidatively cleaving the 1-oximinocycloalkane-2-ones obtained.

This second oxidative cleaving step is conducted employing the same reaction conditions of pressure, temperature and time, as well as the solvents previously disclosed as being used for the first step comprising oxidation and photochemical isomerization. The foregoing oxidative cleaving results in the formation of an aliphatic compound comprising the omega-hydroxamidoalkanoic acids.

The third step of the invention comprises taking the omega-hydroxamidoalkanoic acid and catalytically reducing it to the desired omega-aminoalkanoic acid, the reduction conditions being adjusted so as to prevent conversion of the carboxylic acid to an alcohol. The catalyst employed for the reduction may be any hydrogenation catalyst known in the art, such as Raney nickel. The reduction is conducted additionally with hydrogen or hydrogen in combination with an inert gas as previously defined, water vapor or any compound known in the art that will react at the conditions employed for the reduction to produce hydrogen which can be used in the reduction and not adversely affect the reaction. The reduction is also conducted in the presence of a nitrogen compound, such as a primary, secondary or tertiary amine, such as the alkyl amines, the aryl amines, and the alkyl aryl amines, as well as heterocyclic nitrogen compounds, such as piperidine and quinoline. The alkyl amines or alkyl aryl amines employed in this regard preferably comprise the lower alkyl amines or lower alkyl aryl amines, such as diethylamine, triethylamine, triisopropylamine, tributylamine, dimethylamine and the like. The aryl groups may be any moiety selected from the group phenyl, benzyl, naphthyl, xylyl or tolyl. Examples of aryl or alkylaryl amines comprise phenyl amine, dimethyl phenyl amine, benzyl amine, naphthyl amine and the like. The preferred nitrogen compound, however, is ammonia. The reduction is also carried out optionally in the presence of a solvent which is inert towards the reactants by which it is intended that any solvent may be employed which is empirically observed to dissolve the reactants and which does not enter into and/or does not adversely affect the process.

The reduction is carried out for a period of time sufficient to obtain an omega-aminoalkanoic acid and conducted at temperatures from about 20° up to about 150° C. and at pressures from about 20 p.s.i.g. to about 500 p.s.i.g., precautions being taken so as to prevent the omega-hydroxamidoalkanoic acid from being reduced to an amino alcohol, i.e., the reduction reaction conditions should be mild enough to prevent reduction of the carboxyl group a hydroxyl group.

Any cyclic hydrocarbon may be employed according to the present invention, especially the saturated cyclic hydrocarbons and preferably the saturated cyclic hydrocarbons that are free of other substituents, whether inorganic or organic. The cyclic hydrocarbons contain up to about 12 ring carbon atoms, such as the six, eight and 10 ring carbon atom cyclic hydrocarbons. Specific examples of compounds within this class include cyclohexane, cyclooctane and cyclodecane, cyclododecane and the like.

The novel oximino ketones obtained according to the first step of the present invention are derived from the cyclic hydrocarbons and, accordingly, contain the same number of carbon atoms. The oximino ketones prepared in this respect comprise the 1-oximinocycloalkane-2-ones where the cycloalkane group contains up to about 12 carbon atoms, e.g., the cycloalkane group contains six ring carbon atoms, eight ring carbon atoms, 10 ring carbon atoms and 12 ring carbon atoms. Oximino compounds in this respect, for example, comprise 1-oximinocyclohexane-2-one obtained from cyclohexane or 1-oximinocyclododecane-2-one obtained from cyclododecane.

The omega-hydroxamidoalkanoic acids which result from the oxidative cleavage of the oximino ketones also contain up to about 12 carbon atoms, specific examples of which are those containing six, eight, 10 or 12 carbon atoms as in the case of 6-hydroxamidohexanoic acid and 12-hydrox-amidododecanoic acid.

The following examples are illustrative.

EXAMPLE 1

This example illustrates the method of reacting cyclododecane with hydroxylamine oxidatively under photochemical conditions to obtain the oximino ketone which is oxidatively cleaved to the hydroxamido acid and catalytically reduced to an amino acid.

A quartz reaction vessel equipped with a heating jacket is charged with 168 grams (1.0 mol) of cyclododecane, 33 grams of hydroxylamine (1mol) and 0.8 grams of cupric chloride to form a reaction mixture after which oxygen is bubbled through the mixture and irradiated with light from a Hanovia medium pressure 450W. mercury vapor lamp. The reaction is conducted for several hours until an oximino ketone 1-oximinocyclododecane-2-one, is obtained which is separated from the reaction mixture. The oximino ketone is then charged to a pyrex flask equipped with a heating jacket and brought up to its melting point after which oxygen is bubbled through the molten oximino ketone until an acid, 12-hydroxamidododecanoic acid, is obtained. The acid is removed and purified by conventional techniques and then reduced with hydrogen and ammonia in the presence of Raney nickel in order to obtain 12-aminododecanoic acid.

EXAMPLE 2

The method of Example 1 is repeated; however, employing cyclohexane and an oximino ketone, 1-oximinohexane-2-one, is obtained which is oxidatively cleaved to give 6-hydroxamidohexanoic acid which is subsequently catalytically reduced in the same manner as described in Example 1 to obtain 6-aminohexanoic acid.

The amino acids obtained according to the method of the present invention are employed in the manufacture of polyamides by methods known in the art, by heating such amino acids. These polyamides are formed into fibers or monofilaments and the like or molded articles such as containers.

The novel oximino ketones are used in the formation of the amino acids by oxidatively cleaving them to give the desired hydroxamidoalkanoic acids which are subsequently catalytically reduced to such amino acids.

When all the foregoing equivalent reaction conditions and reactants which are described are employed, the same general results are obtained as noted herein. Several of the equivalent conditions and reactants have been described broadly by reference to a range of equivalents by which it is intended that such ranges are to include the specific values between the upper and the lower limits thereof, as well as narrower ranges within the broad range disclosed. Thus, for example, the temperature for conducting the process is described as from about −10° to about 150° C.; however, temperatures from about 10° to about 40° C. may be employed and any specific value, for example −10° C., 40° C, 20° C., 15° C. or 150° C. falling within this broad range is also intended as well as a narrower range within this broad range, such as, for example, 10° to about 15° C.

Furthermore, where the hydrocarbon, for example, has been described preferably as one containing up to about 12 ring carbon atoms, it is intended to include those hydrocarbons which can be described by a narrower range, such as hydrocarbons having from about six to about 12 or about eight to about 12 ring carbon atoms and so forth for the other ranges used to define the equivalents of the invention. The various conditions and reactants described as being suitable for the present invention are used in any combination with one another and substantially the same results are obtained as disclosed herein.

Although the invention has been described by reference to certain embodiments, it is not intended that the novel compositions and processes be limited thereby, but that certain modifications are intended to be within the spirit and broad scope of the foregoing disclosure and following claims.

What I claim is:

1. 1-oximino-cyclododecane-2-one.

* * * * *